United States Patent [19]

Omori et al.

[11] 4,304,885
[45] Dec. 8, 1981

[54] POLYBUTADIENE RUBBER COMPOSITIONS

[75] Inventors: Toshio Omori; Yutaka Obata, both of Yokkaichi; Noboru Ohshima, Suzuki, all of Japan

[73] Assignee: Japan Synthetic Rubber Co., Ltd., Tokyo, Japan

[21] Appl. No.: 183,168

[22] Filed: Sep. 2, 1980

[30] Foreign Application Priority Data

Sep. 4, 1979 [JP] Japan ............................... 54-112456

[51] Int. Cl.$^3$ ................................................ C08L 9/00
[52] U.S. Cl. ..................................................... 525/236
[58] Field of Search ......................................... 525/236

[56] References Cited

U.S. PATENT DOCUMENTS 3,281,389 10/1966 Hirshfield ........................... 525/236

OTHER PUBLICATIONS

Japanese Patent Application Kokai (Laid-Open) No. 115,137/74, English Abstract, Derwent Publications, 09956 W/06.

Primary Examiner—J. Ziegler
Attorney, Agent, or Firm—Oblon, Fisher, Spivak, McClelland & Maier

[57] ABSTRACT

A polybutadiene rubber composition comprising (A) a polybutadiene rubber obtained by solution polymerization and having a Mooney viscosity ($ML_{1+4}^{100°\,C.}$) of 60–110 and a 1,4-configuration content of not less than 60%, preferably not less than 70%, and (B) a polybutadiene polymer obtained by solution polymerization and having a viscosity-average molecular weight of 20,000–140,000, preferably 40,000–100,000, and a 1,4-configuration content of not less than 60%, preferably not less than 70%, in which composition the weight ratio of (A)/(B) is 100/5–100/150, preferably 100/35–100/100, and the Mooney viscosity ($ML_{1+4}^{100°\,C.}$) of which composition is 20–70. This composition is high in tackiness in the unvulcanized state and also excellent in the physical properties of vulcanizate.

5 Claims, No Drawings

POLYBUTADIENE RUBBER COMPOSITIONS

This invention relates to a polybutadiene rubber composition comprising a normally solid polybutadiene rubber obtained by solution polymerization and an extremely soft low-molecular-weight polybutadiene polymer obtained by solution polymerization. This composition can give a high-tackiness unvulcanized blend and also a vulcanizate having excellent physical properties.

Polybutadiene rubber (BR) obtained by solution polymerization is a general-purpose synthetic rubber which is superior to natural rubber, styrene-butadiene rubber (SBR) and polyisoprene rubber (IR) obtained by solution polymerization in abrasion resistance, resilience, low heat build-up and physical properties at low temperatures. Owing to such excellent properties, BR is used in great quantities for tyres, hoses, belts, footwear and the like. Generally, the process for the production of rubber goods comprises a step of laminating the unvulcanized rubber blend to form a shaped article, and in this step the tackiness of the unvulcanized rubber blend is an important factor. There is an increasing trend recently toward multi-layer lamination for the production of belts, hoses, etc., and the continuous laminating operation by use of an extruder or calender rolls is generally practised, with further efforts being made for speed-up of said lamination step by use of an extruder or calender rolls for further improvement of productivity. This calls for use of synthetic rubber with a high tackiness.

Generally, however, a synthetic rubber is poor in tackiness, and BR is not an exception; it is unsatisfactory in tackiness owing to its chemical structure and production process. Therefore, if the tackiness of BR is improved, its better application to belts, hoses and the like can be expected.

From such a viewpoint, a tackifier such as cumarone-indene resin, phenol-formaldehyde resin, etc., is blended with the BR and other synthetic rubbers for the purpose of increasing the tackiness thereof. The tackifier is usually added in an amount of 3–5 parts by weight per 100 parts by weight of the rubber. Addition of said tackifier can indeed improve the tackiness of the unvulcanized blend, but because the tackifiers, in general, have no reactivity and play no part in formation of the three-dimensional structure by vulcanization, the physical properties of the vulcanizate, particularly tensile strength, modulus, hardness and resilience, become inferior to those of the tackifier-free solid rubber. Thus, according to the conventional proposals, the tackiness of the BR blend is certainly improved, but the degree of improvement is not significantly great and also the physical properties of the vulcanizate thereof are not satisfactory. Therefore, there has been strongly desired polybutadiene rubber composition which shows a high tackiness in the unvulcanized state and is also excellent in physical properties of vulcanizate.

The present inventors have conducted extensive studies for providing a composition that can meet such a request and have found as a result that the object can be accomplished by blending, in a specific ratio, (A) a polybutadiene rubber obtained by solution polymerization and having a Mooney viscosity ($ML_{1+4}^{100°\ C.}$) of 60–110 and (B) a polybutadiene polymer obtained by solution polymerization and having a viscosity-average molecular weight of 20,000–140,000.

An object of this invention, therefore, is to provide a polybutadiene rubber composition which has a high tackiness in the unvulcanized state and also shows excellent physical properties of vulcanizate.

Other objects and advantages of this invention will become apparent from the following description.

According to this invention, there is provided a polybutadiene rubber composition consisting essentially of (A) a polybutadiene rubber having a Mooney viscosity ($ML_{1+4}^{100°\ C.}$) of 60–110, said rubber having been obtained by solution polymerization, and (B) a polybutadiene polymer having a viscosity-average molecular weight of 20,000–140,000, said polymer having also been obtained by solution polymerization, said composition having a (A)/(B) weight ratio of 100/5–100/150 and a Mooney viscosity ($ML_{1+4}^{100°\ C.}$) of 20–70.

Because of the excellent physical properties of its vulcanizate and also the high tackiness shown in the unvulcanized state, the polybutadiene rubber composition of this invention can appropriately be used for the production of composite laminates such as belts, hoses, etc.

It is essential that the polybutadiene rubber (A) produced by solution polymerization in this invention has a Mooney viscosity ($ML_{1+4}^{100°\ C.}$) of from 60 to 110, preferably from 65 to 100, more preferably from 65 to 85. If the Mooney viscosity of said rubber is less than 60, it is difficult for the vulcanizate of the final rubber composition to maintain the satisfactory physical properties, particularly modulus and hardness, because a low-molecular-weight polymer (B) is further mixed with the polybutadiene (A) in this invention. When the rubber (A) has a Mooney viscosity of more than 110, it can be called an ultra-high-molecular-weight polymer, and the product therefrom, even a mixture thereof with the low-molecular-weight polymer (B), is inferior in processability and inappropriate in practical use.

The low-molecular-weight polybutadiene polymer (B) produced by solution polymerization, which is to be mixed with the polybutadiene rubber (A) in this invention, needs to have a viscosity-average-molecular weight of from 20,000 to 140,000. Especially, when the polymer has a viscosity-average molecular weight of from 40,000 to 100,000 the rubber composition has a high tackiness in the unvulcanized state and is excellent in physical properties of its vulcanizate, and hence, such a range of viscosity-average-molecular weight is particularly preferred. The most preferred range is from 50,000 to 100,000. When a polybutadiene polymer (B) with a viscosity-average molecular weight of less than 20,000 is used, the tackiness of the rubber composition in the unvulcanized state is low and the physical properties of its vulcanizate, particularly tensile strength, tear strength and modulus, are unsatisfactory because said polymer (B) has substantially no part in formation of the three-dimensional structure by vulcanization. Also, a rubber composition comprising the polymer (B) having a viscosity-average molecular weight of more than 140,000 does not meet the object of this invention as the rubber composition has a low tackiness in the unvulcanized state.

The amount of the polybutadiene polymer (B) to be mixed with the polybutadiene rubber (A) in this invention is selected from the range of 5 to 150 parts by weight to 100 parts by weight of the polybutadiene rubber (A) so that the composition has a Mooney viscosity ($ML_{1+4}^{100°\ C.}$) of from 20 to 70. If the amount of the polybutadiene polymer (B) is less than 5 parts by weight, no desired improvement of tackiness of the unvulcanized blend is obtained, while if the amount of the polymer (B) exceeds 150 parts by weight, the physical properties of the vulcanizate, particularly modulus, tensile strength and hardness, become unsatisfactory and also the tackiness of the unvulcanized blend is not much improved. Therefore, such a rubber composition does not fit for practical use as an elemental material for various kinds of rubber goods. For these reasons, the most preferred amount range of the polybutadiene polymer (B) in this invention is from 35 to 100 parts by weight. It is to be also noted that if the Mooney viscosity of the composition is less than 20, the physical properties of vulcanizate become unsatisfactory and hence such a composition is unsuitable for use as an elemental material for various rubber products. Also, a rubber composition with a Mooney viscosity of more than 70 is unusable as such a composition is poor in processability. The preferred range of Mooney viscosity of the composition of this invention is from 25 to 65.

Both polybutadiene rubber (A) and polybutadiene polymer (B) of this invention can be easily produced according to the commonly used solution polymerization techniques. For example, the polybutadiene rubber (A) of this invention can be obtained according to a method shown in "THE STEREO RUBBERS" edited by William M. Saltman, published by John Willy and Sons, 1977, pp. 23–40. As the typical examples of the catalyst used in this method, there may be mentioned Ti-containing catalyst such as $TiI_4$-$AIR_3$ wherein R is an alkyl group (this definition applies to the following formulas), $TiCl_4$-$I_2$-$AIR_3$, etc., cobalt-containing catalyst such as cobalt organic carboxylate-$AIR_2Cl$-$H_2O$, cobalt acetylacetonate-$AIR_2Cl$-$H_2O$, cobalt chloride-pyridine complex salt-$AIR_2Cl$-$H_2O$, etc., and nickel-containing catalysts such as nickel organic carboxylate-boron trifluoride etherate-$AIR_3$, nickel organic carboxylate-boron trifluoride etherate-organolithium compound, etc. With such a catalyst, 1,3-butadiene is solution-polymerized in a solvent such as an aliphatic hydrocarbon, an aromatic hydrocarbon, a halogenated hydrocarbon, etc., to obtain a desired polybutadiene rubber. The polymerization method is not limited to the above-mentioned one. The polybutadiene polymer (B) of this invention can be obtained by solution-polymerizing 1,3-butadiene with a nickel or cobalt-containing catalyst such as shown in U.S. Pat. Nos. 3,170,907; 3,471,462; 3,725,492; 3,814,744; 3,816,567; 3,843,618; and 3,985,941, British Pat. Nos. 1,372,088 and 1,373,701, Japanese Patent Application Kokai (Laid-Open) No. 6685/75, C. Dixon et al., EUROPEAN POLYMER JOURNAL, Vol. 6, pp. 1359–1370 (1970), and M. Gippin, I. & E. C., PRODUCT RESEARCH AND DEVELOPMENT, Vol. 1, No. 1, pp. 32–39 (1962). Such a solution polymerization may be carried out in a hydrocarbon solvent by using an organic lithium compound as a polymerization initiator. Among these and other available catalysts, the following are most recommendable: a catalyst obtained by reacting (a) a Ni organic carboxylate or an organic complex compound with (b) a trialkylaluminum in the (b)/(a) molar ratio of 0.3 to 1.0 in the presence of 1,3-butadiene and then adding thereto (c) boron trifluoride or a complex compound thereof. When 1,3-butadiene is solution-polymerized with this catalyst in a hydrocarbon solvent, a desired low-molecular-weight polymer can be produced in a high yield even in a small catalyst amount. The polymerization method in this invention is not limited to the above-mentioned.

The polybutadiene rubber (A) and the polybutadiene polymer (B) used in this invention have such a microstructure that the 1,4-configuration content is not less than 60%, preferably the cis-1,4-configuration content is not less than 70%, more preferably not less than 80%, for giving a desired rubber-like composition.

In obtaining the rubber composition of this invention, the polybutadiene rubber (A) and the polybutadiene polymer (B) may be mixed in the form of solutions, or alternatively, solids obtained from the solutions may be mixed. The same rubber composition as obtained by said mixing method can also be obtained by a special polymerization method capable of forming a mixture of a high-molecular-weight polymer rubber (A) and a low-molecular-weight polymer (B) in one step.

The thus obtained rubber composition of this invention is blended with compounding agents such as a reinforcing agent, for example, carbon black, etc.; a vulcanizing agent; a vulcanization accelerator; etc., and then used for the production of various kinds of rubber products.

The invention is explained in further detail below referring to Examples, which are merely by way of illustration and not by way of limitation.

REFERENTIAL EXAMPLE

Preparation of high-molecular-weight polybutadiene rubber (A) by solution polymerization:

A polybutadiene rubber was prepared by polymerizing 1,3-butadiene in toluene with a catalyst system composed of triethylaluminum, nickel naphthenate and boron trifluoride-ethyl etherate. After adding a polymerizatization-terminator, the unreacted butadiene was recovered and a toluene solution of a polymer at a concentration of about 13% was obtained. The Mooney viscosity of the polybutadiene rubber thus obtained was 78, and its microstructure, as measured by infrared analysis, was as follows: cis-1,4-configuration 96.5%, trans-1,4-configuration 1.5%, and 1,2-configuration 2%.

Preparation of low-molecular-weight polybutadiene polymer (B) by solution polymerization:

A polymer was prepared by polymerizing 1,3-butadiene in toluene with a catalyst obtained by reacting nickel naphthenate with triethylaluminum in the presence of a small quantity of 1,3-butadiene and then adding to the reaction mixture boron trifluoride-ethyl etherate. The viscosity-average molecular weight of the polymer was adjusted by changing the amount of the catalyst added. After adding a polymerization-terminator, the unreacted butadiene was recovered and a toluene solution of a polymer at a concentration of about 10% was obtained. The low-molecular-weight polybutadiene polymers thus obtained had the microstructures (examined by infrared analysis) and viscosity-average molecular weights shown in Table 1.

TABLE 1

| Specimen | Microstructure (%) | | | Viscosity-[1] average molecular weight (Mv) |
|---|---|---|---|---|
| | cis-1,4 | trans-1,4 | Vinyl | |
| B-1 | 84 | 12 | 4 | 12,000 |
| B-2 | 86 | 10 | 4 | 30,000 |
| B-3 | 89 | 8 | 3 | 50,000 |
| B-4 | 92 | 5 | 3 | 100,000 |

TABLE 1-continued

| Speci-men | Microstructure (%) | | | Viscosity-*1 average molecular weight (Mv) |
|---|---|---|---|---|
| | cis-1,4 | trans-1,4 | Vinyl | |
| B-5 | 94 | 4 | 2 | 160,000 |

Note:
*1 $[\eta]_{+\ C}^{Toluene} = 1.22 \times 10^{-4} Mv^{0.78}$
$[\eta]$: intrinsic viscosity

EXAMPLES 1 TO 3 AND COMPARATIVE EXAMPLES 1 TO 7

A predetermined amount of the toluene solution of the polybutadiene rubber (A) and a predetermined amount of the toluene solution of the low-molecular-weight polybutadiene polymer (B) were mixed and, after recovering the solvent by steam distillation, the mixture was washed with water, dehydrated and then dried, thereby obtaining 5 specimens of rubber composition with (A)/(B)=100/37.5 (weight ratio). This rubber composition or commercially available solution-polymerized BR was kneaded by a Banbury mixer or a roll with the following compounding recipe, and the tackiness of the resulting compound in the unvulcanized state and the physical properties of the vulcanizate thereof were evaluated.

| Compounding Recipe | parts by weight |
|---|---|
| Rubber composition or commercially available BR | 100 |
| Zinc oxide | 3 |
| Stearic acid | 1 |
| Carbon black (HAF) | 50 |
| Antioxidant (N-phenyl-N'-isopropyl-p-phenylenediamine) | 1 |
| Accelerator (N-t-butyl-2-benzothiazolyl sulfenamide) | 0.8 |
| Sulfur | 1.75 |

Vulcanization conditions: 145° C., 15 min.
The results obtained are shown in Table 2.

TABLE 2

| | Comparative Example 1 | Example 1 | Example 2 | Example 3 | Comparative Example 2 | Comparative Example 3 | Comparative Example 4 | Comparative Example 5 | Comparative Example 6 | Comparative Example 7 |
|---|---|---|---|---|---|---|---|---|---|---|
| Mooney viscosity of rubber (A) ML$_{1+4}^{100° C.}$ | 78 | 78 | 78 | 78 | 78 | — | — | — | — | — |
| Commercially available BR | — | — | — | — | — | JSR BR01*2 | DIENE 35*3 | UBE-OL*4 BR150 | JSR BR01 | JSR BR01 |
| Viscosity average molecular weight of polymer (B) | 12,000 | 30,000 | 50,000 | 100,000 | 160,000 | — | — | — | — | — |
| (A)/(B) weight ratio | 100/37.5 | 100/37.5 | 100/37.5 | 100/37.5 | 100/37.5 | — | — | — | — | — |
| Mooney viscosity of composition (ML$_{1+4}^{100° C.}$) | 30 | 34 | 36 | 41 | 46 | 43 | 35 | 42 | 43 | 43 |
| Tackifier (PHR) | — | — | — | — | — | — | — | — | 5 | 10 |
| Mooney viscosity of compound (ML$_{1+4}^{100° C.}$) | 58.0 | 66.0 | 71.0 | 73.0 | 76.0 | 82.0 | 78.0 | 83.0 | 78.0 | 70.0 |
| Unvulcanized compound Tackiness*1 (g) | 310 | 430 | 620 | 500 | 300 | 250 | 110 | 130 | 300 | 500 |
| Physical properties of vulcanizate | | | | | | | | | | |
| 300% modulus (Kg/cm$^2$) | 44 | 53 | 60 | 68 | 72 | 78 | 76 | 74 | 47 | 34 |
| Tensile strength (Kg/cm$^2$) | 132 | 143 | 149 | 170 | 173 | 186 | 172 | 175 | 150 | 120 |
| Elongation (%) | 620 | 540 | 560 | 570 | 560 | 580 | 470 | 530 | 550 | 520 |
| Hardness (JIS-A) | 48 | 53 | 57 | 59 | 60 | 61 | 60 | 61 | 59 | 54 |
| Dunlop resilience (25° C.) (%) | 46 | 48 | 49 | 53 | 55 | 56 | 54 | 55 | 53 | 50 |

Note:
*1 Measured by using a pickup tester (at 25° C.)
*2 Produced by Japan Synthetic Rubber Co., Ltd. (cis-1,4 94.8%; trans-1,4 3.3%; vinyl 1.9%)
*3 Produced by Asahi Kasei Kogyo Kabushiki Kaisha (cis-1,4 32.6%; trans-1,4 53.3%; vinyl 14.1%)
*4 Produced by Ube Industries, Ltd. (cis-1,4 94.5%; trans-1,4 2.4%; vinyl 3.1%)

As shown in Comparative Examples 3-5, the commercially available BR gives a low tackiness to the unvulcanized compound. Also, as shown in Comparative Example 6, no significantly high tackiness improving effect is seen even if a tackifier is added to the commercial available BR in an amount of 5 parts by weight per 100 parts by weight of BR. When the amount of the tackifier added is further increased to 10 parts by weight, the tackiness is improved about twice that before addition of the tackifier but the physical properties such as modulus and tensile strength of the vulcanizate thereof are greatly deteriorated as shown in Comparative Example 7. Also, the unvulcanized compound of the polybutadiene rubber (A) with the low-molecular-weight polybutadiene polymers having a viscosity-average molecular weight of 12,000 and 160,000, respectively (Comparative Examples 1 and 2) give no noticeable improvement of tackiness; they merely show a tackiness about twice that of the commercially available BR.

It is found in Examples 1 to 3 that the tackiness of the unvulcanized compound of polybutadiene rubber obtained by solution polymerization is appreciably improved only when a low-molecular-weight polybutadiene polymer obtained by solution polymerization and having a viscosity-average molecular weight of 20,000-140,000, preferably 40,000-100,000, is blended according to the method of this invention. Also, deterioration of the physical properties of the vulcanizate caused by addition of the low-molecular-weight polybutadiene polymer is extremely low in the case of adding the low-molecular-weight polybutadiene polymer with a viscosity-average molecular weight of 20,000-140,000, preferably 40,000-100,000, according to this invention, as compared with the case where improvement was made by adding a tackifier to BR.

EXAMPLES 4 TO 6 AND COMPARATIVE EXAMPLES 8 TO 11

A toluene solution of a high-molecular-weight polybutadiene rubber with a Mooney viscosity of 68 was obtained in the same way as in the Referential Example, and a predetermined amount of this rubber solution was mixed with a predetermined amount of a toluene solution of a low-molecular-weight polybutadiene polymer Specimen B-3 obtained in the Referential Example, and after recovering the solvent by steam distillation, the mixture was washed with water, dehydrated and then dried, thereby obtaining 5 kinds of objective rubber compositions. Each composition was subjected to compounding with the same recipe as in Examples 1 to 3 and to kneading in the same way as in Examples 1-3 and the tackiness of the unvulcanized compound was compared with that of the commercially available BR. The results are shown in Table 3.

cant improvement is provided in tackiness of the unvulcanized compound and also a vulcanizate with excellent physical properties is given only when the high-molecular-weight polybutadiene rubber (A) and the low-molecular-weight polybutadiene polymer (B) are blended in the (A)/(B) weight ratio of 100/5-100/150 according to this invention.

When a polymer obtained by emulsion polymerization was used as the low-molecular-weight polybutadiene polymer (B), substantially no improvement in tackiness was observed as is clear from Comparative Example 11.

What is claimed is:

1. A polybutadiene rubber composition consisting essentially of (A) a polybutadiene rubber obtained by solution polymerization and having a Mooney viscosity ($ML_{1+4}^{100° C.}$) of 60-110 and a 1,4-configuration content of 60% or more and (B) a polybutadiene polymer obtained by solution polymerization and having a viscosity-average molecular weight of 20,000-140,000 and a 1,4-configuration content of 60% or more, said composition having an (A)/(B) weight ratio of 100/5-100/150 and a Mooney viscosity ($ML_{1+4}^{100° C.}$) of 20-70.

2. A polybutadiene rubber composition according to claim 1, wherein the polybutadiene rubber (A) has a cis-1,4-configuration content of not less than 70%.

3. A polybutadiene rubber composition according to claim 1 or 2, wherein the polybutadiene polymer (B) has a viscosity-average molecular weight of 40,000-100,000 and a cis-1,4-configuration content of not less than 70%.

4. A polybutadiene rubber composition according to claim 1, 2 or 3, wherein the (A)/(B) weight ratio in the

TABLE 3

|  | Comparative Example 8 | Example 4 | Example 5 | Example 6 | Comparative Example 9 | Comparative Example 10 | Comparative Example 11 | Comparative Example 3 | Comparative Example 5 |
|---|---|---|---|---|---|---|---|---|---|
| Mooney viscosity of rubber (A) ($ML_{1+4}^{100° C.}$) | 68 | 68 | 68 | 68 | 68 | 50 | 68 | — | — |
| Commercially available BR | — | — | — | — | — | — | — | JSR BR01 | UBEPOL BR150 |
| Viscosity-average molecular weight of polymer (B) | 50,000 | 50,000 | 50,000 | 50,000 | 50,000 | 50,000 | 50,000*[1] | — | — |
| (A)/(B) weight ratio | 100/2 | 100/7 | 100/37.5 | 100/140 | 100/200 | 100/100 | 100/37.5 | — | — |
| Mooney viscosity of composition ($ML_{1+4}^{100° C.}$) | 65 | 58 | 33 | 22 | 16 | 23 | 36 | 43 | 42 |
| Mooney viscosity of compound ($ML_{1+4}^{100° C.}$) | 98.0 | 89.0 | 67.0 | 51.0 | 35.0 | 42.0 | 70.0 | 82.0 | 78.0 |
| Tackiness of unvulcanized Compound (g) | 140 | 390 | 640 | 500 | 320 | 530 | 240 | 250 | 130 |
| Properties of vulcanizate |  |  |  |  |  |  |  |  |  |
| 300% modulus (Kg/cm$^2$) | 85 | 82 | 57 | 42 | 26 | 30 | 59 | 78 | 74 |
| Tensile strength (Kg/cm$^2$) | 190 | 185 | 144 | 130 | 115 | 120 | 145 | 186 | 175 |
| Elongation (%) | 540 | 550 | 560 | 590 | 620 | 590 | 560 | 580 | 530 |
| Hardness (JIS-A) | 61 | 60 | 58 | 56 | 52 | 56 | 59 | 61 | 61 |
| Dunlop resilience (%) | 58 | 56 | 52 | 48 | 40 | 45 | 47 | 56 | 55 |

Note:
*[1] Emulsion-polymerized with a redox catalyst at 70° C. (cis-1,4 11%; trans-1,4 66%; vinyl 23%)

As shown in Comparative Example 8, when the amount of the low-molecular-weight polybutadiene polymer (B) mixed is 2 parts by weight per 100 parts by weight of the high-molecular-weight rubber (A), no tackiness improving effect is obtained on the unvulcanized compound. Also, as shown in Comparative Example 9, when the amount of the low-molecular-weight polymer (B) mixed is 200 parts by weight per 100 parts by weight of the high-molecular-weight rubber (A), no marked improvement of tackiness of the unvulcanized compound is given and the physical properties of the vulcanizate are deteriorated. It is thus seen that a significomposition is within the range of from 100/35 to 100/100.

5. A polybutadiene rubber composition according to claim 1, wherein the polybutadiene rubber (A) has a Mooney viscosity of 65-85 and a cis-1,4-configuration content of at least 80%, the polybutadiene polymer (B) has a viscosity-average-molecular weight of 50,000-100,000 and a cis-1,4-configuration content of at least 70%, and the (A)/(B) weight ratio is 100/50-100/100.

* * * * *